Sept. 2, 1930.　　　　R. G. COATES　　　　1,774,634
STEERING GEAR
Filed Oct. 24, 1927　　　2 Sheets-Sheet 2
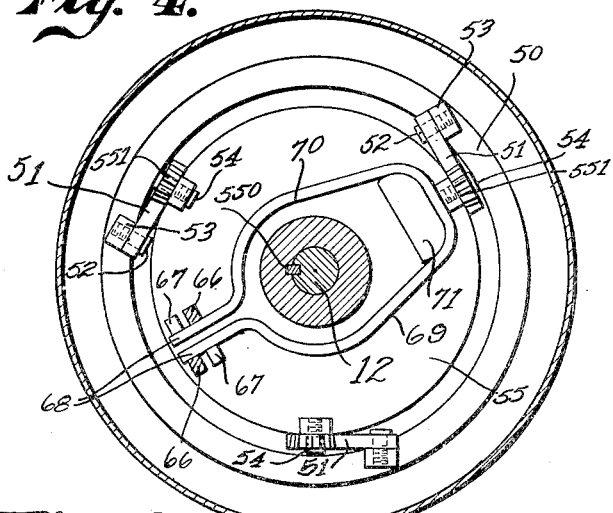
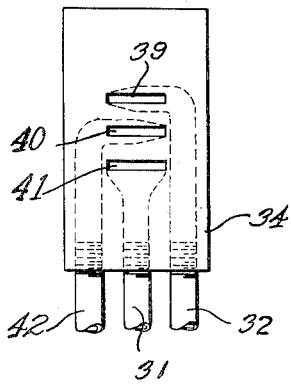
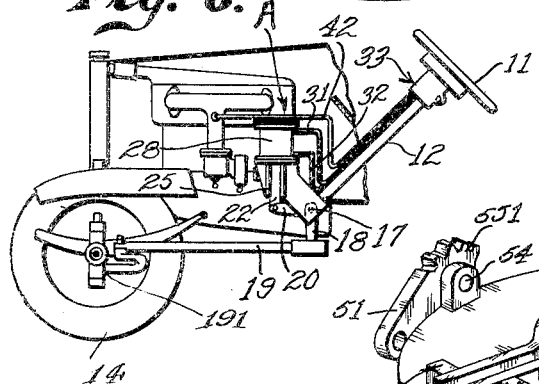
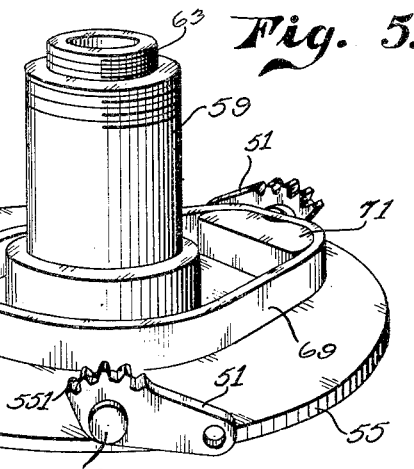
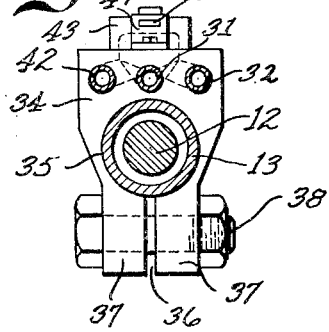
Inventor
Ray G. Coates;
By Lyon & Lyon
Attorneys Patented Sept. 2, 1930

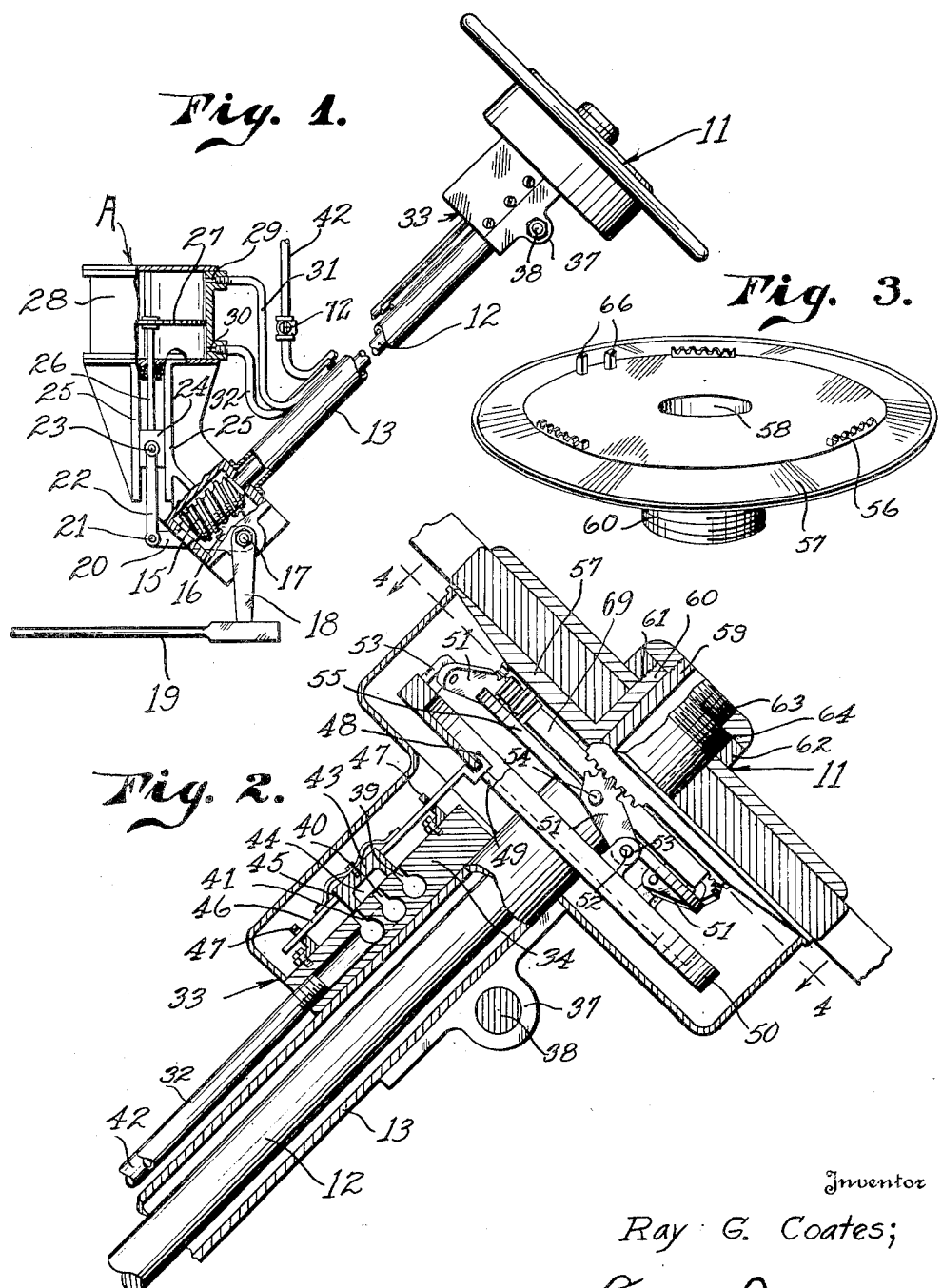

1,774,634

UNITED STATES PATENT OFFICE

RAY G. COATES, OF PASADENA, CALIFORNIA

STEERING GEAR

Application filed October 24, 1927. Serial No. 228,199.

This invention relates to steering gears and, more especially, to a type of steering gear to which mechanical power is applied, at least part of the time, to effect operation of the steering gear.

It is well known that the controlling hand-operated steering wheel of a motor car turns easily when the road-engaging wheels of the car are rolling rapidly over the road and that said steering wheel turns with great difficulty when the road-engaging wheels are rolling very slowly or not at all. The advent of balloon tires has greatly emphasized this latter characteristic. When the streets and curbs are not crowded there are few drivers who lack the necessary strength to handle the steering wheel of a car. When, however, the streets and curbs are congested with cars parked parallel with the curb and there is little space in which to maneuver, it is frequently required that the guiding wheels be changed in direction while the car is standing still, otherwise what little maneuvering space there may be will be used up before the car has made any appreciable movement toward the curb along which it is desired to park the car. This condition of affairs calls for strength in the driver's arms and it thus happens that many of the less robust car owners find themselves limited in the use they can make of their motor cars, and, knowing these difficulties, many possible buyers hesitate to purchase cars.

It is also well known that the common forms of steering gears could be given such a ratio between the travel of the hand wheel rim and the rate of change in the direction of the guiding wheels of the car as would enable even the least robust driver to change the direction of the guiding wheels while the car is stationary. This, however, could only be accomplished by very greatly slowing down the rate of angular change in the position of the guiding wheels relative to a given angular movement of the hand wheel. The changes that have already been made in this respect, since the advent of balloon tires, have reached a practical limit since it is even now almost impossible to turn many new model cars into an intersecting street without steering them out into the opposing traffic of the street entered, and yet the effort to turn the guiding wheels when the latter are not rolling is still very great.

An important object of my invention is to so improve the steering mechanism of motor cars that a person of comparatively little strength may readily turn the hand-operated steering wheel in all situations in which a car is intentionally placed.

Another object is to accomplish the above mentioned result without increasing the ratios between the travel of the rims of the steering wheels and the rate of change in the angle of the guiding wheels of the cars as at present constructed, and, if desired, to even allow of a decrease in the said ratio.

Another object is to accomplish the above results with the driver of the car unconscious of any change in the action of the steering gear other than the absence of the strenuous work required, at times, in the manipulation of the present steering gears.

Another object of the invention is to aid the driver of the vehicle in the operation of the steering gear.

Another object is to make provision for the application of mechanical power in the operation of steering only when the resistance to steering of the vehicle reaches a predetermined value.

Another object is simplicity and inexpensiveness of construction.

Another object is to provide a construction that can be readily applied to existing steering gears.

Another object is to make provision for utilizing the partial vacuum produced by the engine of a motor car for aiding in the steering of said motor car.

The above results I accomplish by providing a power auxiliary which works conjointly with the driver whenever the resistance to the turning of the steering wheel rises above a predetermined value. My invention may be carried out in many ways. The mechanism may be variously incorporated into the structure of motor cars according to the limitations set by the numerous designs manufactured. The steering gear herein shown in the drawings and described is for illustrative purposes only and is not to be construed in a limiting sense for the invention may be variously embodied without departing from the spirit and scope thereof, as expressed in the accompanying claims.

Further objects and advantages will appear in the subjoined detailed description.

The accompanying drawings illustrate the invention.

Figure 1 is a broken side elevation of a steering gear constructed in accordance with the provisions of this invention, portions thereof being shown in section for clearness of illustration.

Figure 2 is an enlarged view, mainly in vertical mid-section of the steering gear, the plane of section being parallel to the plane of Figure 1.

Figure 3 is a perspective view of the rack member.

Figure 4 is a transverse section on the line indicated by 4—4, Figure 2.

Figure 5 is a perspective view of the lever carrying member with the levers and the spring mounted thereon.

Figure 6 is an elevation of the front face of the valve block.

Figure 7 is an end view of the valve, the steering shaft and its housing being shown in section.

Figure 8 is a fragmental side elevation, partly in section, of a motor vehicle provided with a steering gear embodying the invention.

The steering gear parts now to be described may be of the usual construction and, for the purpose of this description, may be considered as typical of the ordinarily used type of steering gear. There is provided a steering wheel 11 which is mounted on the upper end of a shaft 12 that extends through a housing or hollow column 13. The housing 13 is secured in the usual manner to the chassis of the motor vehicle. The shaft 12 is connected by any suitable means to the guiding wheels, only one of which is shown at 14 in Figure 8, and, in this instance, this means comprises a worm 15 on the lower end of the shaft 12, a pinion sector 16 in mesh with the worm 15, a shaft 17 on which the pinion sector 16 is mounted, an arm 18 fixed to the shaft 17 and a rod 19 which is operated endwise by movement of the arm 18. The rod 19 is connected, in a manner well understood in this art, by a steering knuckle 191 with the steering wheel 14.

The novel features of the invention will now be described. An auxiliary power unit is provided and is indicated, in general, at A. The power unit A is connected by any suitable mechanism to the guiding wheels of the vehicle, and this mechanism and the auxiliary power unit may be constructed, for example as follows: Fixed in any suitable manner to the shaft 17 is an arm 20 that, in this instance, extends substantially at a right angle to the arm 18. The outer end of the arm 20 is pivoted at 21 to the lower end of a pitman 22. The upper end of the pitman 22 is pivoted at 23 to a slide 24 working between spaced vertical guides 25. The slide 24 is connected by a rod 26 to a partition 27 in a chamber 28. Thus, the partition 27 and chamber 28 constitute one form of motor that is connected with the guiding wheels so as to aid in the operation of steering said guiding wheels, at times, in accordance with the operation of said motor. The partition 27 may constitute a plunger and the chamber 28 a cylinder for the plunger to work in, or said partition may be nothing more than a flexible diaphragm.

The auxiliary power unit may be under the car body or under the "hood" or in any other convenient location. It may have a vertical or horizontal stroke. If its stroke does not line up satisfactorily with the stroke of the member to which it is to be connected then appropriate means for changing the direction of the force applied may be used.

The operation of the motor is controlled, in this instance, by the mechanism now to be described. The cylinder 28 is provided with ports 29, 30 at its opposite ends so that said ports lie on opposite sides of the plunger 27. The ports 29, 30 are connected, respectively, by conduits 31, 32 to a valve which is indicated, in general, by the character 33. The valve 33 may be mounted in any suitable location and, in this instance, is shown as mounted on the housing 13. The valve 33, in this instance, is a slide valve and is constructed as follows: A valve block 34 is provided with an orifice 35 of sufficient size to receive the housing 13 and said block is slit at 36 between ears 37 thereof so that the block may be clamped to the housing 35 by a bolt 38 which passes through the ears 37. The construction and operation of this type of valve is well understood and certain details of its construction will only be described in order to make clear the operation of the invention. In this instance, the block 34 is provided with upper, intermediate, and lower ports 39, 40, 41, respectively. The port 39 communicates with the conduit 32 and the port 41 communicates with the conduit 31. Thus, it will be clear that the port 39 controls induction and exhaust of the operating fluid for the lower end of the cylinder 28 and that the port 41 controls induction and exhaust of the operating fluid for the upper end of the cylinder. The port 40 communicates with a conduit 42 which is adapted to connect with the intake manifold of the engine, not shown, of the vehicle so that upon operation of the engine a partial vacuum, resulting from said operation, will be established in the conduit 42.

The ports 39, 40, 41 open to the front face of the block 34 and upon said front face slides the port controlling valve member 43 which is in the form of a block provided at its inner face with a recess 44 that is sufficiently long to communicate at one time either with the ports 39, 40 or the ports 40, 41 according as the member 43 is in its upper position or in its lower position. In Figure 2 the member 43 is shown in its intermediate position and, accordingly, only the port 40 is in communication with the recess 44. To operate the member 43, said member fits in an opening 45 in a reciprocating member 46 which is mounted to slide in bearings 47 secured to the block 34. The upper end of the member 46 forms a U-shaped member 48 which embraces the margin of an axial opening 49 in a member 50. In this instance, the member 50 is circular and the housing 13 passes through the opening 49. The member 50 is adapted to be raised and depressed by the operation of levers 51 which are pivotally connected at 52 to upwardly projecting ears 53 of the member 50. The ears 53 are positioned at intervals around the member 50 near the periphery thereof. The fulcrums of the levers 51 are indicated at 54 and said fulcrums are carried by a member 55 which, in this instance, is in the form of a disc or circular plate. The member 55 is secured, as by a key 550, to the shaft 12, as clearly shown in Figure 4. The levers 51 are provided at the ends adjacent to the fulcrums 54 with pinion sectors 551 which are in mesh with a rack or racks 56 projecting from the under face of a member 57 which, in this instance, is in the form of a disc or circular plate. The member 57 is provided with an axial opening 58 through which projects a tubular stud 59 that, in turn, projects upwardly from the upper face of the member 55. The shaft 12 extends through the bore of the sleeve 59 which, in turn, extends through the opening 58 in the member 57. The opening 58 extends through a sleeve 60 which projects through the hub of the steering wheel 11. The outer end of the sleeve 60 is externally screw threaded at 61 to receive a nut 62 which thus secures the member 57 to the steering wheel in position beneath said wheel and in contact therewith so that the member 57 will rotate with the steering wheel. The upper end of the sleeve 59 is externally screw threaded at 63 to receive a nut 64 which bears upon the upper end of the sleeve 60 so as to rotatably support the member 55 with respect to the steering wheel 11. In this instance, it is desirable that the levers 51 will not be operated by turning of the steering wheel until the resistance against turning of the shaft 12 reaches a predetermined value, in order that, when the steering of the vehicle is comparatively easy, the steering can be effected wholly by hand operation of the steering gear, the mechanical power only coming into action when the predetermined value of the resistance is exceeded. For this purpose, there is provided a yielding connection between the members 55, 57, said yielding connection yieldingly resisting turning of the member 57. The connection, in this instance, is constructed as follows: Projecting downwardly from the under face of the member 57 are spaced shoulders 66 and projecting upwardly from the upper face of the member 57 are spaced shoulders 67. When the members 55, 57 are relatively turned to the positions shown in Figure 2 so that the shoulders 66, 67 are relatively positioned as in Figure 4, the shoulders 66 and shoulders 67 are spaced slightly so as to accommodate between them the opposite straight ends 68 of a spring 69. The spring 69 will be under sufficient tension, when in position, to cause the member 56 to turn with the steering wheel 11 until the predetermined degree of resistance to turning of the shaft 12 has been exceeded. It is to be understood that the resistance to turning of the shaft 12 is that resistance that is produced by that portion of the steering gear that connects the shaft with the dirigible wheels of the vehicle, and produced by the grade and character of the surface upon which the dirigible wheels rest. The spring 69 is formed with a relatively large opening 70 between the opposite sides thereof so that said spring surrounds the sleeve 59. Into the opening 70 extends a lug 71 that projects from the upper face of the member 55, said lug fitting inside of one end of the spring so as to hold said spring in fixed relation to the member 55. Thus, it will be seen that, when the steering wheel 11 is turned while the resistance against turning of the shaft 12 is comparatively slight, the spring 69 will transmit the turning motion to the member 55 in which event there will be no movement between the racks 56 and pinion sectors 551 and, accordingly, the member 50 will not be shifted lengthwise of the housing 13 to cause movement of the valve member 43. However, as soon as the value of the resistance to operation of the steering gear reaches a predetermined amount, the spring 69 will yield when the steering wheel 11 is turned, thus causing the member 57 to turn relative to the member 55. This relative turning causes the racks 56 to operate the pinion sectors 551, thereby rocking the levers 51 which results in shifting of the member 50 lengthwise of the housing 13. This shifting of the member 50 causes endwise movement of the member 46 so as to slide the valve member 43.

The less the stiffness of springs 69 the more readily the steering wheel will trip the valve. The strength of this spring can be made to suit. A desirable strength is such that for ordinary running conditions the valve should not move. This keeps the driver up to muscular attention. The spring 69 should react against the shoulders 66, 67 with enough force to allow the steering wheel to do normal steering without tripping the valve. Its acting stroke, after starting to move, should be made with little change in resistance during the stroke. This is to insure the valve making a full stroke after starting to open or close.

While I have illustrated a steering gear in which the mechanism controlling the auxiliary power is located near the upper part of the steering column it will be evident that such mechanism may be connected to any convenient member of the steering gear which has oscillating movements coincident with the oscillating movements of the rim of the steering wheel, provided the force applied by the auxiliary power does not pass through the manually operated control mechanism. As shown, the control mechanism is connected to a member of the steering gear having a curvilinear movement. By "developing" the curvilinear paths of 55 and 57 into rectilinear ones the controlling mechanism may be attached to a member having an approximately rectilinear movement as will be clear to one skilled in this art.

The parts 55 and 57 and their connecting elements constitute one form of means for securing a limited interruption or lost motion in the positive connection between the steering wheel and the members controlling the planes of the guiding wheels. The interruption permits the steering wheel rim to travel slightly without a change in the plane of the guiding wheels when the resistance to deflection of said guiding wheels exceeds the strength of the spring 69. The movement of the steering wheel during this interruption is utilized to apply auxiliary power to aid the steering wheel in carrying out its work.

The invention above described operates as follows: Assuming, for example, that the driver of the vehicle, equipped with the invention, is operating the vehicle on a comparatively smooth roadway under conditions where the dirigible wheels of the vehicle are comparatively easy to steer, the driver will turn the steering wheel 11 in the usual manner to effect steering, the spring 69 serving to transmit motion of the steering wheel to the member 55. Accordingly, as pointed out above, the valve member 43 will not be operated. Now, assuming that turning of the steering wheel 11 meets with considerable resistance, as might be occasioned in excessive operation of the steering gear as required, for example, in parking a car alongside of a curb between two other cars, the driver will turn the steering wheel 11 to the right to turn the dirigible wheels of the vehicle to the right and the relatively high resistance to turning that the shaft 12 meets with causes the spring 69 to yield or be compressed sufficiently to permit the racks 56 to turn to the right relative to the pinion sectors 551, thus swinging the levers 51 upwardly which results in moving of the valve member 43 from the neutral position shown in Figure 2 to a position in which the recess 44 communicates with the port 39 as well as the port 40. Accordingly, the partial vacuum that has been established in the conduit 42, by operation of the engine of the vehicle, produces a lowered pressure in the conduit 32 while atmospheric pressure has access to the port 41. Thus pressure in the cylinder 28 will be reduced below the plunger 27, thereby lowering said plunger so as to rock the arm 20 downwardly, thus to aid in turning the shaft 17 anti-clockwise in Figure 1, which is the direction in which it is turned by the aforementioned turning of the steering wheel 11.

As long as the driver continues to exert sufficient turning effort on the steering wheel 11 to compress the spring 69 the valve member 43 will remain in position to exhaust air from the cylinder 28 below the plunger 27. As soon as the dirigible wheels have been turned to the right as far as desired, the driver will relieve his pressure upon the steering wheel 11 and, immediately, the spring 69 will expand and turn the steering wheel to the left sufficiently far to swing the levers 51 downwardly into positions that result in the valve member 43 being returned to the neutral position, thus communicating the cylinder on both sides of the plunger 27 with the atmosphere and thereby discontinuing the application of power to the rod 19.

To return the dirigible wheels of the vehicle to positions for steering in a straightaway course or to turn said dirigible wheels to the left, the operator will turn the steering wheel 11 to the left in the customary manner, thus actuating the worm 15 and, as soon as turning of the dirigible wheels meets with sufficient resistance to compress the spring 69, said spring will permit of a small amount of turning movement of the member 57 to the left relative to the member 55, thereby swinging the levers 51 downwardly so as to move the member 50 in a direction to slide the valve member 43 from the neutral position shown in Figure 2 into a position that communicates the recess 44 with the port 41 as well as the port 40. Thus, the pressure will be lowered above the plunger 27 so as to cause said plunger to move upwardly, thereby turning the shaft 17 clockwise which is the direction it is caused to turn by left-hand turning of the steering wheel 11.

When the dirigible wheels have been turned to the left as far as desired, the driver will relieve his pressure upon the steering wheel 11, thus permitting the spring 69 to turn the steering wheel to the right to effect movement of the valve member 43 to the neutral position, thereby to discontinue the application of power to the rod 19 as explained more fully above.

It will be observed that, when the steering wheel is turned, a force is exerted tending to turn the guiding wheels of the car in one or the other direction just as with the common steering gears, and that if the car is moving the guiding wheels immediately yield to this tendency and little effort is required to effect a change in direction. This is the normal action and, since the effort in such cases is small, the entire work of steering is done by the hand. If, however, the car is standing still, or moving very slowly, the steering wheel offers a large resistance to turning and finally, when the driver's effort is sufficiently increased, the spring 69 yields and allows the steering wheel to turn relative to the member 55 to the limit of its predetermined movement.

The rate of angular change in the position of the guiding wheels when changing the direction of the car is never high. In parking and in practically all situations in which there is a noticeable resistance to the turning of the steering wheel the speed of the car is very slow. This is also the time that the engine is throttled down and there is the lowest pressure in the intake manifold. The speed of the travel of the partition 27 is never high. Therefore, since the effective pressure is highest at such times as the partition is called on to do work in shifting the guiding wheels, it follows that the dimensions of the partition need not be large. Its slow speed allows of the use of relatively small connecting pipes or conduits to connect the parts of the structure together. Relatively small valve ports are sufficient and this places only a relatively small amount of work on the valve operating apparatus.

In the neutral position of the valve member 43, the ports 39, 41 are open to the atmosphere so that when the resistance to steering is so slight that the steering is effected entirely by hand, the plunger 27 can be moved freely up or down by operation of the arm 20 caused by rotation of the pinion sector 16, the air pressure being equalized on opposite sides of the plunger 27 through the conduits 31, 32.

In case it is desired to cut out the mechanism from the inlet manifold pressure a three way valve 72 in the conduit 42 can be turned to do this and at the same time permit atmospheric air to enter the conduit 42. All of the conduits and the two end portions of the chamber 28 on opposite sides of the partition 27 will then be in equilibrium and the auxiliary power will not act on the steering gear. In this case the action will be the same as ordinary steering gears.

While I have illustrated and described a particular type of motor and a control means therefor, it is to be understood that other satisfactory types of motor and control means may be employed without departing from the scope of the invention. Air is the operating medium in the present instance, but the character of said medium will depend upon the type of motor employed.

While I have illustrated and described the member 57, pinion sectors 551, fulcrums 54, shoulders 66, 67 spring 69 and key 550, as constituting the means for operably connecting the shaft 17 and the manually operated member 11, which means exerts a predetermined degree of resistance to relative turning between said shaft and the member 11; and while I have illustrated and described the levers 51, pivots 52, ears 53, and members 46, 50 as constituting the means operable by said relative turning to operate the control means 33, it is to be understood that any or all of said means may be otherwise constructed within the scope of the invention.

With my steering gear no thought or attention is required on the part of the driver if the steering wheel is difficult to turn. He simply tries to turn it as he would with the present steering gears. If the resistance is considerable the continued pull at the rim of the steering wheel finally causes the spring 69 to yield and the auxiliary power then causes the guiding wheels to move in accord with the pull on the steering wheel rim so long as the spring 69 remains compressed or until the maximum deflection of the guiding wheels has been reached. The minimum pull on the rim of the steering wheel of my steering gear to effect operation of the valve 33 may be, as desired, any fractional part of the maximum pull required on the rim of the steering wheel of the common forms of steering gear, to shift the guiding wheels against such resistance that obtains when the guiding wheels are in the most unfavorable positions for shifting.

With the common steering gear system I have found a rim pull of sixty pounds required to move the steering wheel of a standing car which moved with the thumb and finger when the car was running. In my gear all "peak" turning efforts above any desired maximum pull on the steering wheel rim can be taken up by the auxiliary power, so that a consideration of physical strength in the driver is unnecessary.

I claim:

1. The combination with an automobile having guiding wheels, of a steering motor, a means operably connecting said motor to said guiding wheels, a steering gear including coacting and relatively rotatable members, one of said members being manually operable, a means to operably connect the other member to said first mentioned means, of a spring means between said members, stops on said members cooperating with the spring means whereby said members are held rigidly together below a predetermined tangential stress on said manually operable member, and a steering motor control means operable by relative rotation of said members when said predetermined stress is exceeded.

2. The combination with an automobile having guiding wheels, a steering motor, a means operably connecting said motor to said guiding wheels, a steering motor control means, a steering gear including coaxial and relatively rotatable members, one of said members being manually operable, a means to operably connect the other member to said first mentioned means, of a lever mounted on one of said members and operably connected to the other member by one arm of said lever, and an operable connection between the other arm of said lever and the said steering motor control means.

3. The combination with an automobile having guiding wheels, a steering motor operably connected to said guiding wheels, a steering motor control means, a steering gear including coaxial and relatively rotatable members, one of said members being manually operable, a means to operably connect the other member to said first mentioned means, a lever mounted on one of said members and operably connected to the other member by one arm of said lever, of a connection between the other arm of said lever and said steering motor control means, said connection including an element rotating with said members around their common axis and a coacting non-rotating element movable in a plane normal to the plane of said members.

4. The combination with an automobile having guiding wheels, and a motor provided with an intake manifold, of a steering gear comprising coaxial rotatably mounted members, a means to limit the relative angular movement of said members, one of said members being manually operable, means to operably connect the other member to said guiding wheels, a connecting spring between said members accompanied by spring stops on said members whereby said members are held against any relative angular movement below a predetermined tangential stress on said manually operable member, a piston operably connected to said second mentioned means, a cylinder in which said piston is movable, a conduit connecting the ends of said cylinder with said intake manifold, a control valve in said conduit, a lever mounted on one of said members and connected to the other member by one arm of said lever, an element rotating simultaneously with said members and capable of movement normal to the plane of said members, a connection between the other arm of said lever and said element, a nonrotating element coacting with said first mentioned element, and a connection between said non-rotating element and said control valve.

Signed at Los Angeles, California, this 28th day of September 1927.

RAY G. COATES.